June 19, 1962 R. P. B. YANDELL 3,039,690
COMPUTING MACHINES
Filed Oct. 8, 1956 7 Sheets-Sheet 1
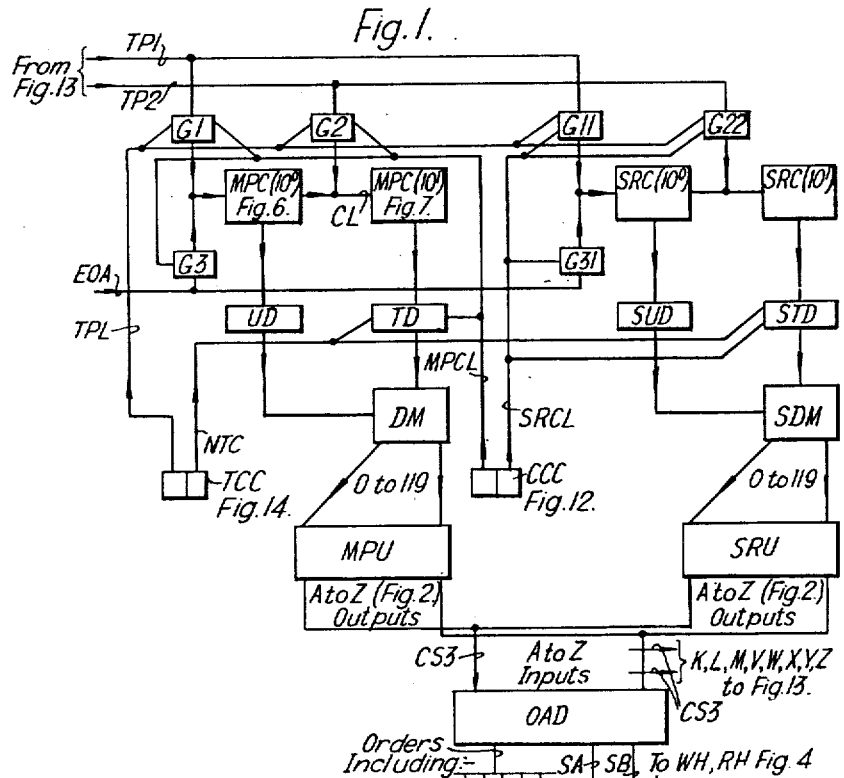
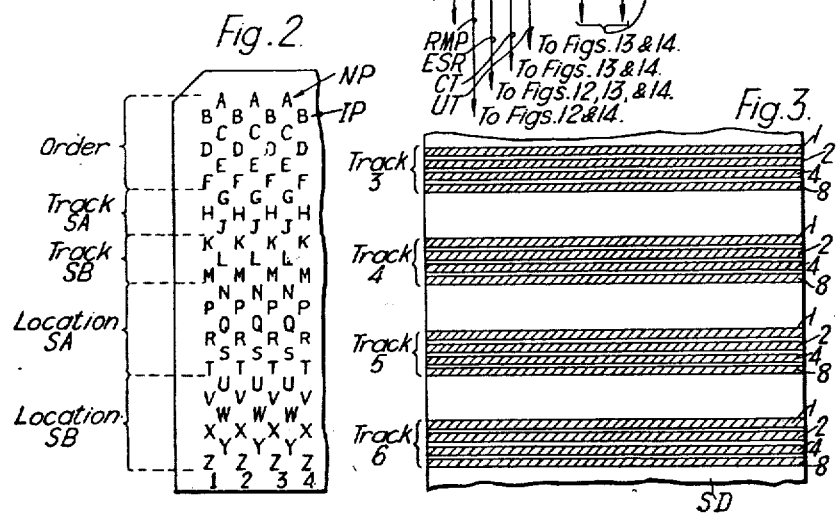
Inventor
RONALD P. B. YANDELL June 19, 1962 R. P. B. YANDELL 3,039,690
COMPUTING MACHINES
Filed Oct. 8, 1956 7 Sheets-Sheet 2
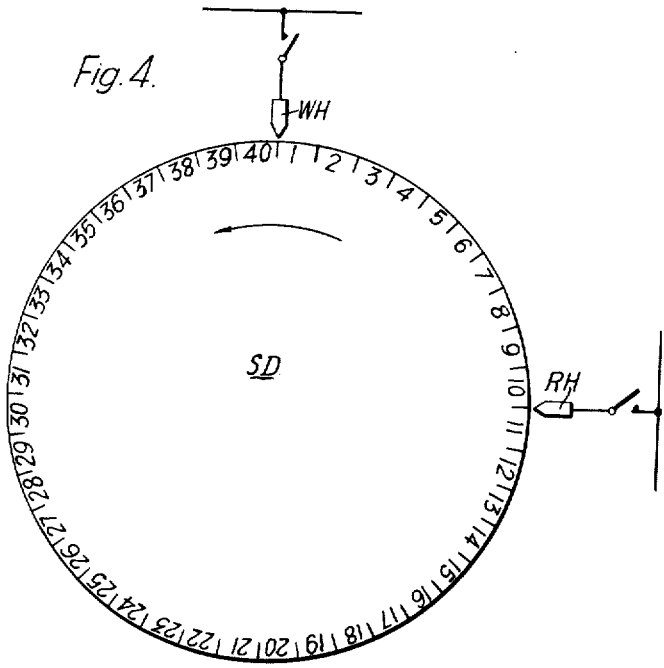
Inventor
RONALD P.B. YANDELL

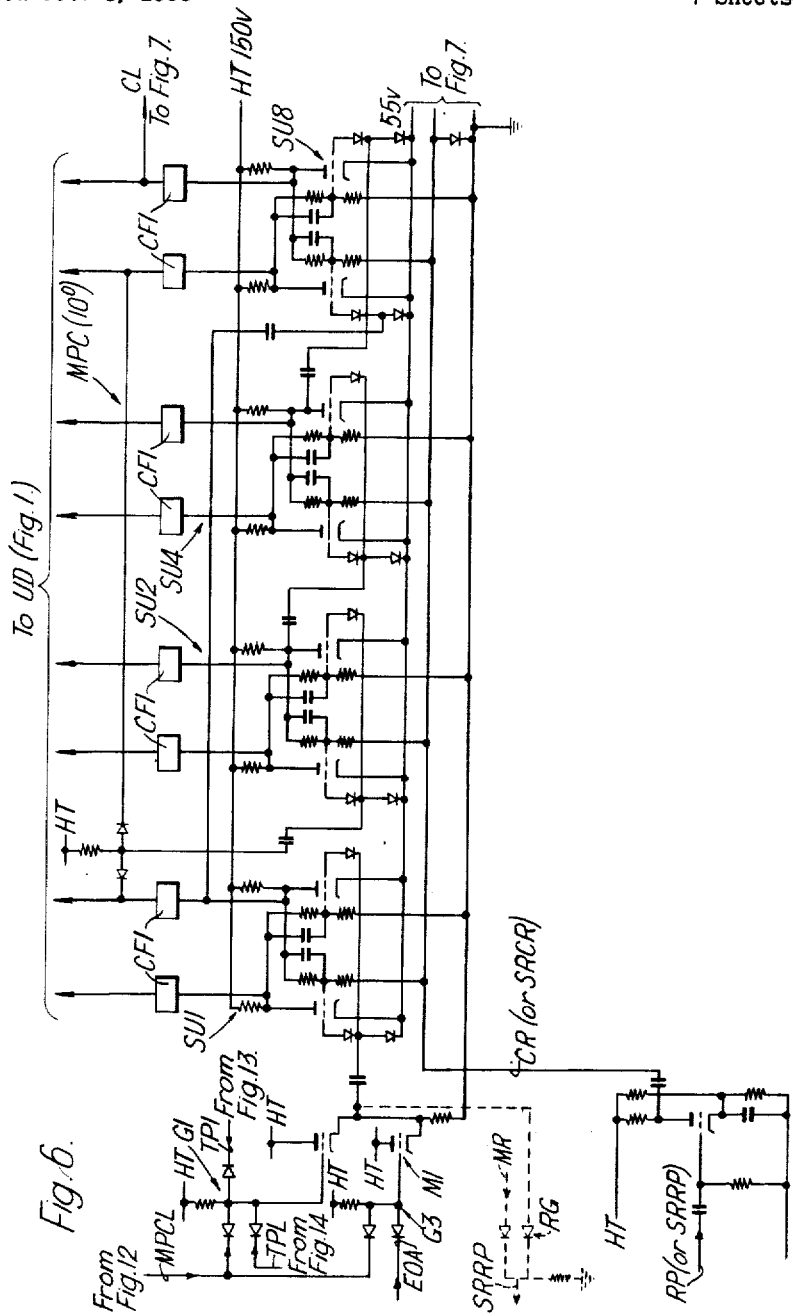

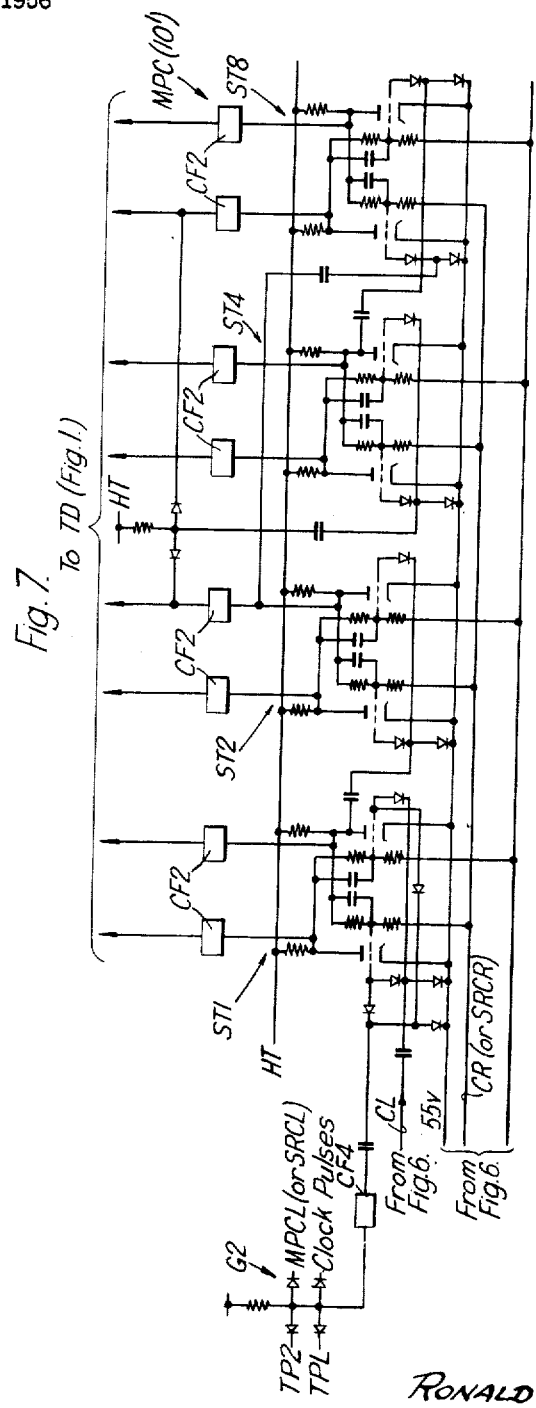

Inventor
RONALD P.B. YANDELL
By

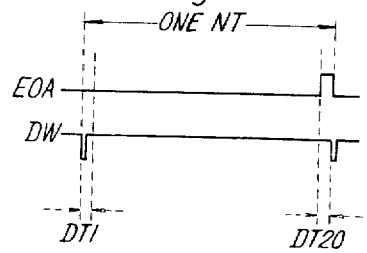
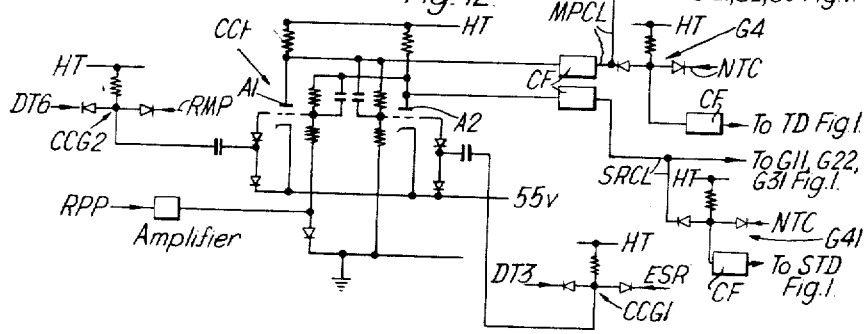
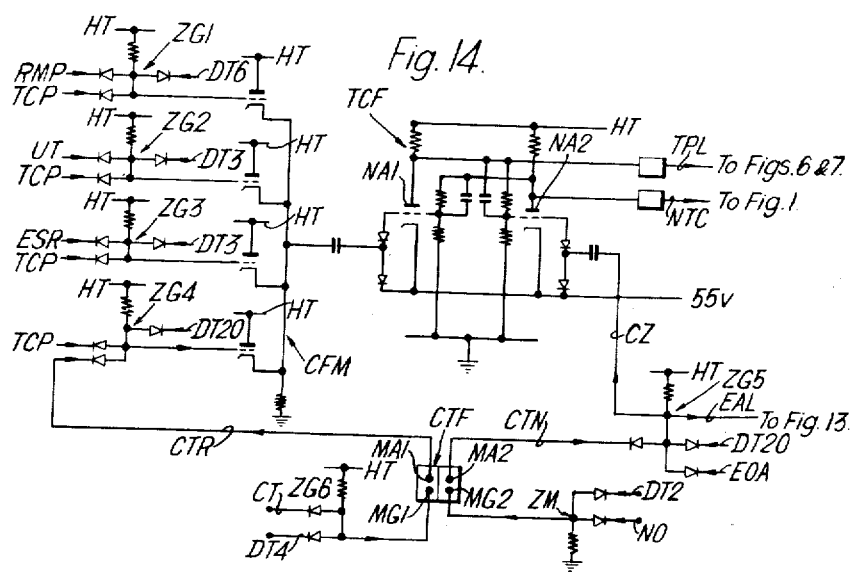

United States Patent Office 3,039,690
Patented June 19, 1962

3,039,690
COMPUTING MACHINES
Ronald Percy Bawden Yandell, Streatham, London, England, assignor, by mesne assignments, to International Computers and Tabulators Limited, London, England, a British company
Filed Oct. 8, 1956, Ser. No. 614,451
Claims priority, application Great Britain Nov. 16, 1955
15 Claims. (Cl. 235—157)

This invention relates to computing machines and in particular to programme controlled computing machines.

In some forms of programme controlled computing machines the programme is entered into the machine, each instruction according to a code, by the data input means provided in the machine. The instructions so entered are placed into storage from whence individual instructions can be obtained by addressing the appropriate storage locations. This system allows flexibility in the sequence of operations so that, when required, the instructions can be taken out of their normal sequence, this facility being known as transfer of control. With these known forms of machine, however, it is necessary to provide storage for the programme instructions in addition to the storage required for the data to be processed and such additional storage amounts to an appreciable amount of the total storage capacity.

It is a main object of the present invention to provide in a programme controlled computing machine means whereby the provision of the aforesaid additional storage capacity can be avoided while still retaining the facility for transfer of control to an instruction other than that which is the next in order of sequence.

A further object of the invention is to make provision for sub-routines, both permanent and interchangeable, and to arrange that control can be transferred between a main programme and sub-routines as required.

In principle these objects are carried into effect by providing apparatus for the reading of a static programme for a main programme and also when required for the sub-routines, such static programmes consisting of plug-boards, or of statistical record cards, or of "printed circuits"; a record card, or a "printed circuit" being hereinafter, for convenience, referred to as "a programme card," thereby resulting in a programme controlled machine which is particularly suitable for use as a commercial machine in which the same programme is repeatedly carried out on a large number of different sets of numerical input data.

According to the present invention there is provided in an electrical programme controlled computing machine, programming apparatus comprising electrical contacts connected in normally inactive instruction lines and pre-settable to predetermine the significance of instructions, an instruction decoder arranged to decode instructions for transmission as orders by order lines, activating means operative normally to activate the instruction lines sequentially, and control means connecting said activating means with an order line and operable during activation of such line to control modification of the operation of the activating means thereby to cause the activating means to effect activation of an instruction line other than that which is next in sequence to the instruction line which, through the appropriate order line, causes operation of the control means.

In order that the invention may be clearly understood one embodiment thereof will now be described, by way of example, with reference to the accompanying drawings, in which:

FIG. 1 is a block diagram of apparatus according to the present invention,

FIG. 2 illustrates a portion of a programme card,

FIG. 3 is an elevation of a portion of a magnetic data-storage drum,

FIG. 4 illustrates the arrangement of data-receiving sections for a track extending round the drum at right-angles to the axis of rotation thereof, FIG. 5 illustrates the manner of recording data on a data-receiving section of the drum, FIGS. 6 and 7 together illustrate a scale-of-120 counter.

Figure 8:
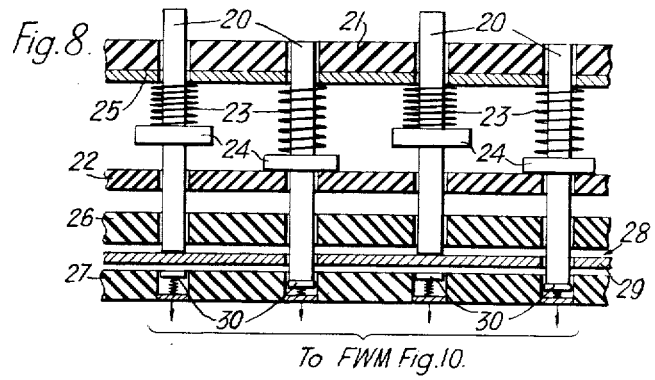
Figure 9:
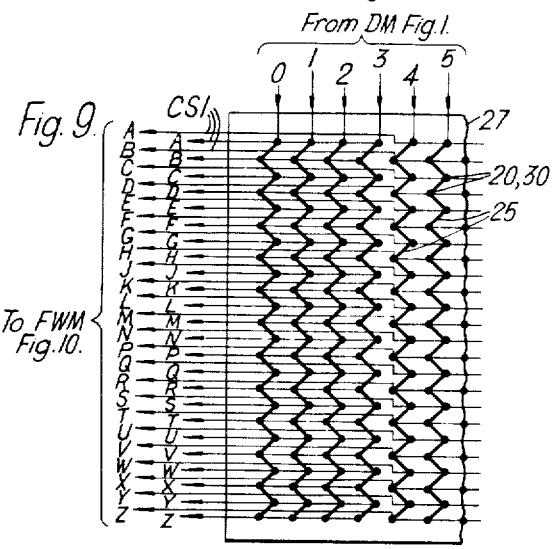
Figure 10:
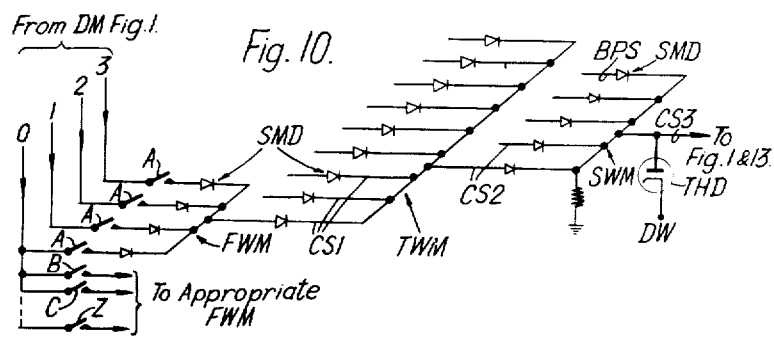
Figure 13:
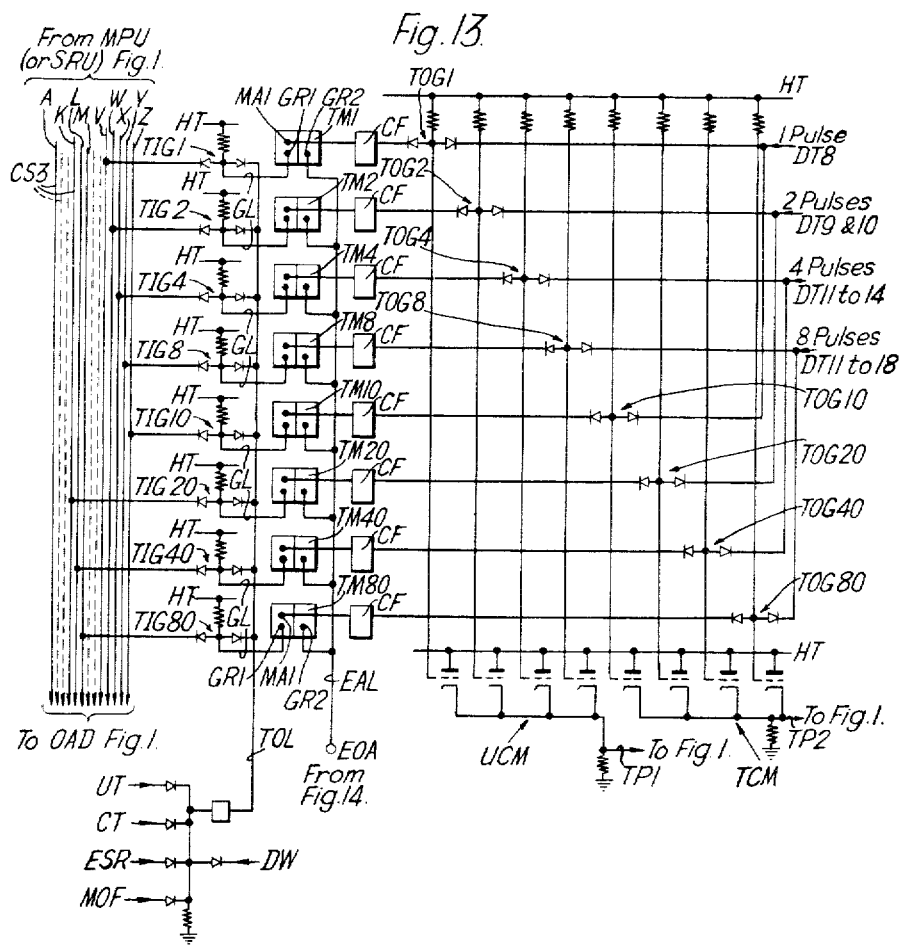

FIG. 8 diagrammatically illustrates a device for sensing perforated programme cards, FIG. 9 diagrammatically illustrates a portion of the electrical connections for the sensing of one programme card, FIG. 10 is a mixing circuit, FIG. 11 is a wave-form diagram, FIG. 12 is a control circuit for suppressing one of two counters when the other is operative, FIG. 13 is a circuit by which transfer pulses are produced to transfer control to an instruction other than that which is the next in order of sequence, and FIG. 14 is a circuit which controls the application of transfer pulses to a counter.

The computing machine to which the apparatus according to the present invention is applied is of the kind in which the machine is presented with a programme consisting of a series of instructions, each capable of performance by the machine, each such instruction being expressed in two parts consisting of an order, which instructs the machine as to the operation to be performed by it, but without informing it as to the numbers which are to be operated upon, and an address or addresses which inform the machine as to the storage location or locations in which are to be found the number or numbers to be operated upon. The machine to which, for the purposes of description, the apparatus according to the invention is to be applied is one which operates according to a two-address system so that an instruction normally takes the form of:

*Order—Address SA—Address SB*

Except in some instances the programme instructions will be obeyed in sequence the exceptions being:

(i) Where at some point in the programme there is a choice of two courses and the choice is to be governed by some condition of a number or numbers in storage. At this point in the programme an instruction must be included to ask a question and the next instruction to be obeyed is selected as the result of the answer to the question. This kind of instruction is referred to as "a conditional transfer of control" and always asks the question "If . . .". The choice of the two courses is always—if the answer is "NO" carry on to the next instruction in sequence, if the answer is "YES" jump out of sequence to some different position in the programme.

(ii) An "unconditional transfer of control" which always results in a jump out of sequence.

(iii) The operation multiplication or the operation division is not controlled by a single instruction but in each instance is a group of instructions. There may be several multiplications (or divisions) required in a given programme so that a large number of programme steps would be required to accommodate such multiplications (or divisions). As this is undesirable, multiplication (or division) instructions, or any other sequences of instructions that are likely to be used repeatedly, are included as "sub-routines." Thus an order to multiply is given to the machine as an order to jump from the sequence of main programme instructions to a predetermined instruction which is the first in the sequence of "sub-routine" instructions dealing with multiplication. On completion of multiplication the control returns to the instruction in the main programme next following the instruction which ordered the jump to the sub-routine.

The mode of programme control is indicated in block diagram in FIG. 1 in which discrete transfer pulses, generated as decribed below, pass along transfer pulse lines TP1, TP2, to gates G1, G2, G11, G22 and thence to a main programme counter MPC(10⁰), MPC(10¹) and a sub-routine counter SRC(10⁰), SRC(10¹), each of which is a scale-of-120 counter, and which, as described in greater detail below, switches from one instruction to another instruction only when an end-of-arithmetic signal EOA is applied to gates G3, G31 signifying that the previous instruction has been obeyed. Only one of the counters is operated at any one time and the counter to be operated depends on whether the programme has reached a point in the main programme or a point in the sub-routine. A jump out of sequence is obtained by adding a selected number of discrete transfer pulses into the appropriate one of the counters and a jump backwards is achieved by adding into a counter a sufficient number of transfer pulses to cause it to count up to capacity and then past zero to the required instruction. For example, assuming that the third instruction on a counter has been passed, the addition of 117 pulses to the counter will result in the selection of the third instruction back.

The number to be added to the appropriate counter is indicated to the machine as part of the selected instruction which usually, is of the form stated above, namely Order—Address SA—Address SB. When a conditional transfer of control is to take place, the Address SA is the address of the number which is to be tested to determine which of two courses is to be followed, and the number to be added to the appropriate counter takes the place of the Address SB. In the case of an unconditional transfer of control, the number to be added to the appropriate counter takes, in the instruction, the place of the Address SB, and no Address SA is included.

The order "enter sub-routine" which switches the control of the machine from a main programme instruction unit MPU, FIG. 1, to a sub-routine instruction unit SRU is accompanied by a number which takes the place of the Address SB, this number being added into the sub-routin counter, which initially stands at zero, to determine the first of the sub-routine instructions to be obeyed; no Address SA is included. When the control of the machine is to be switched from the sub-routine instruction unit back to the main programme instruction unit, the order "return to main program" is signalled by the last instruction of a sub-routine; in this instruction no Address SA or Address SB is included.

Each of the one hundred and twenty activating lines which are the outputs from the counters MPC(10⁰), MPC(10¹) and SRC(10⁰), SRC(10¹) corresponds to one possible instruction, giving a total of two hundred and forty possible instructions. The activating lines for each counter are normally energised in sequence in a sequence of instruction times.

For the main programme there are provided in a main programme instruction unit MPU, FIG. 1, three static, that is stationary and continuously sensed, main programme cards. In the embodiment of the invention being described by way of example, each programme card is an interchangeable 80-column statistical record card, a part of one of which is shown in FIG. 2, and each card will accommodate forty instructions, two adjoining vertical columns being required for each instruction and referred to hereinafter and in the appended claims as "an instruction column." As can be seen from FIG. 2, the alternate vertical columns of the card are punched in the interstage and normal row positions IP and NP, this being to give greater strength to the card because a large number of holes may be punched in each column and also because by so doing there is provided more space for connections to sensing contacts described below. Each card column, as is usual, provides twelve hole positions so that, by using two adjoining card columns for each instruction column, there are provided twenty-four hole positions for each instruction, such positions being indicated by the latters A to Z (letters O and I are not employed). These twenty-four hole positions are divided between the order and the addresses SA, SB, the addresses each consisting of two groups of hole positions indicated respectively as Track SA, Location SA, Track SB, Location SB.

The terms "track" and "location" are used to denote addresses on a storage drum SD, FIGS. 3 to 5, forming no part of the present invention but which will be briefly described to facilitate the understanding of the present invention.

The storage drum SD has, in known manner, a magnetisable peripheral surface and is arranged for continuous rotation about its longitudinal axis. Data is stored on a plurality of areas of the drum, referred to herein as tracks, extending circumferentially around the drum at right-angles to the axis of the drum and being spaced apart axially on the drum. FIG. 3 illustrates four of said tracks and these, for convenience, are referred to as track 3, track 4, track 5, and track 6. Each of the tracks consists of four bands to which, as indicated in FIGS. 3 and 5, there is allocated respectively the significance 1, 2, 4, 8 to permit the recording of digits on the track according to the 1, 2, 4, 8 code.

Each track, as indicated in FIG. 4, is, to suit the electronic timing, assumed to be divided into forty track locations which, as indicated in FIG. 4, pass continuously in succession under a write head WH and a read head RH. The interval of time taken by a track location to pass a write head or a read head is referred to as "a number time NT" and reference to the time of any particular track location passing under a head is called NT suffixed by the appropriate number, for example NT1 or NT4. The tracks are addressed together with a particular track location thereon, for example 4/15 indicates track 4 and track location 15 and will normally be addressed during NT15.

The manner in which a number is stored is illustrated in FIG. 5 which, for the purpose of description, is assumed to represent address 3/1. From FIG. 5 it will be seen that address 3/1 is assumed to be sub-divided into twenty portions, each of which during an interval of time NT1 passes beneath a write head WH for a period of time during which one of the digit times pulses DT1 to DT20, as appropriate, permits a figure coded according to the 1, 2, 4, 8 code to be written on the portion of a location passing its write head WH. To allow for the displacement of the read head RH with respect to the write head WH suitable adjustable is made in the timing of the reading. The arrangement is such that only during the application of digit times pulses DT3 to DT18 inclusive are numbers written on to or read from the drum, the digit times pulses DT1, DT2, DT19 and DT20 being reserved for other purposes unconcerned with the present invention. According as to whether an address is to accommodate a Sterling or a decimal number the numbers written or read during the application of digit times pulses DT3 to DT18 have, in terms of powers of ten, the significance illustrated at the bottom of FIG. 5. The magnetised areas MA, FIG. 5, illustrate the manner in which the number £96–15s–11d is written on the drum SD, and the arrangement is such that if a number is to be written at an address where a number is already stored the new number supersedes that already stored.

It will be understood that for each track there must be provided, during each rotation of the drum SD, a succession of 800 pulses to ensure that writing or reading can, as required, be effected in each of the 800 (that is 40 x 20) number-receiving areas provided round the track. These pulses are derived from clock pulses permanently written on the drum SD.

Referring again to FIG. 2, a combination of hole positions A to F indicates the order to be performed, a combination of hole positions, G, H, J, indicates the track Address SA, and a combination of hole positions K,L,M similarly indicates track Address SB. A combination of hole positions N to T indicates the track location SA, while a combination of hole positions U to Z similarly indicates the track location SB. The only departure from this is when, as mentioned above, a number replaces an address in track SB or location SB, FIG. 2, in which instance the positions V, W, X, Y are respectively coded 1, 2, 4, 8 and the positions Z, K, L, M are respectively coded 10, 20, 40, 80.

Of the one hundred and twenty activating lines from the sub-routine counter SRC and which activate the instruction lines from the sub-routine instruction unit SRU, forty require the provision of one 80 column card as described above and these instructions can, accordingly, be changed with the main programme cards. The remaining eighty sub-routine instructions are permanently built-in to the machine and include sub-routines for multiplication, division, and conversion of farthings to decimal pence, and of quarters to decimals, and vice versa.

At any one time only one instruction is selected, although it may be selected from either the main programme or from the sub-routines. Depending on the holes in the programme cards, or the set-up of the sub-routine representing this instruction, a combination of the twenty-four output, or instruction, lines A to Z, FIG. 1, may be activated or energised, that is, they are up in potential, when a counter is triggered to activate the appropriate activating line to select this instruction and the lines so energised for an instruction time which may be one or two number times NT will remain energised until the appropriate activating means, that is counter $MPC(10^0)$, $MPC(10^1)$; or $SRC(10^0)$, $SRC(10^1)$; is again triggered.

The counters may be of any known kind which will provide successively energised outputs, either directly or by decoding, and which can be triggered through a number of states from zero to maximum repeatedly to permit transfer of control as described below. For the purpose of description it is assumed that the counters are flip-flop counters of which the counter $MPC(10^0)$, $MPC(10^1)$ is illustrated in FIGS. 6 and 7, the counter $SRC(10^0)$, $SRC(10^1)$ being similar except for a minor difference referred to below.

Referring to FIGS. 6 and 7, the counter consists of a scale-of-ten units section $MPC(10^0)$, FIG. 6, and a scale-of-twelve tens section $MPC(10^1)$, FIG. 7, consisting respectively of flips-flops SU1, SU2, SU4, SU8, and ST1, ST2, ST4, ST8. The anode potentials of the units counter are passed to a units decoder UD, (or SUD), FIG. 1, through cathode followers CF1, FIG. 6, and the tens counter anode potentials are passed to a tens decoder TD (STD), FIG. 1, through cathode followers CF2, FIG. 7. The 0 to 9 outputs from the decoder UD and the 0 to 11 outputs from the decoder TD are gated together in a matrix DM, FIG. 1, to give the final decoded outputs on the activating lines 0 to 119. The outputs from decoders SUD and STD are similarly gated in a matrix SDM.

The counters $MPC(10^0)$ $MPC(10^1)$ and $SRC(10^0)$, $SRC(10^1)$ operate under the control of a counter control circuit CCC, FIG. 1, shown in detail in FIG. 12, which at the appropriate times causes one or other of lines MPCL, SRCL to be up in potential. When instructions are being carried out in sequence one of the counters is triggered by each end-of-arithmetic signal applied along lines EOA to gates G3, G31, the counter triggered being determined by the particular one of the lines MPCL, SRCL which at that time is up in potential. Transfer control pulses from lines TP1 and TP2 pass through transfer gates G1, G2, G11, G22 when transfer pulse control lines TPL from a transfer control circuit TCC, FIGS. 1 and 14, are up in potential, and are mixed with the end-of-arithmetic signals EOA by a cathode follower load mix M1, FIG. 6. The gate G1 passes the $10^0$ transfer pulses to the scale-of-ten counter if a transfer is called for in the main programme (the transfer may be conditional or unconditional), in which event the MPCL line will be up in potential to permit the transfer to be effected. The gates to the sub-routine counter will at such time be closed as the line SRCL will be in down potential.

The input to the scale-of-twelve counter, FIG. 7, is a mix of carries from the scale-of-ten counter, FIG. 6, and $10^1$ transfer pulses, described below with reference to FIG. 13. A carry from the units counter to the tens counter, which occurs when the right-hand anode of SU8 falls in potential, is passed to the first stage ST1 of the scale-of-twelve counter along line CL, FIGS. 6 and 7.

The $10^1$ transfer pulses on line TPL are gated with clock pulses, permanently recorded on drum SD, and applied to the scale-of-twelve counter during digit times 8 to 18, through gate G2 and a cathode follower CF4.

The negative edge of a $10^1$ transfer pulse might occur simultaneously with a negative pulse on line CL and so get lost. To avoid this possibility the $10^1$ transfer pulses are gated with clock pulses in gate G2. The negative edge of a clock pulse occurs earlier in a digit time DT than the negative edge of a transfer pulse and so a carry from the units counter and produced by a $10^0$ transfer pulse along line CL cannot coincide with a gated $10^1$ pulse from gate G2.

In the case of the main programme counter, the counter is reset at the start of every calculation by a master reset pulse applied at RP, FIG. 6, to line CR. The sub-routine counter, however, is reset to its 119 condition (final instruction) by the master reset pulse and by trigger pulses to the main programme counter so that on switching from a sub-routine to the main programme the sub-routine counter is reset to zero. This is indicated in dotted lines in FIG. 6 where the master reset pulse applied at MR is mixed at RG with trigger pulses to the main programme counter and passes to the sub-routine counter via a line SRRP to a line SRCR corresponding to line CR of FIG. 6.

In the apparatus herein described by way of example, the programme connections are, in part effected by interchangeable programme cards as will now be described with reference to FIGS. 8 to 11.

As mentioned above, each programme card will accommodate forty instructions each of which may be recorded by a combination of data-indicating positions selected from twenty-four such positions in an instruction column of the card. Accordingly, there must, for each programme card, be provided a group of 960 pairs of electrical contacts. These contacts consist of 960 electrically conductive pins 20, FIG. 8, arranged as 80 columns each of twelve pins, one column for each vertical column of a card, and one pin 20 for each of the twelve data-indicating positions of each vertical column of the card. The pins 20 are supported for axial movement by spaced plates 21, 22 each made of electrically insulating material and are urged towards the active position thereof, in which positions they extend through data-indicating perforations in a card, by springs 23 engaged between shoulders 24 on the pins and electrically conductive strips 25, one for each column of pins, as illustrated diagrammatically in FIG. 9, carried by the plate 21. Each strip 25 is connected with the appropriate one of the activating lines from the decoding matrices DM, SDM, FIG. 1.

The plates 21, 22 and the pins 20 carried thereby are supported, by means not shown, for movement towards and away from a programme card holder consisting of two flat fixed insulated members 26, 27 disposed in spaced relation to form a chamber 28 therebetween in which a programme card can be located for co-operation with the pins 20. The member 26 is provided with 960 holes corresponding to the pins 20 and is made of electrically insulating material. The pin unit can be moved away from the members 26, 27 to permit the location of a programme card 29 in the chamber 28 and on again restoring the pin unit to operative co-relation with the members 26, 27 those pins 20 which are aligned with card perforations will pass through the card and those which engage imperforate portions of the card will be moved axially to compress their springs 23, as illustrated in FIG. 8.

Pins 20 which pass through card perforations effect electrical engagement with spring-supported electrical contacts 30 carried by the member 27 while the pins 20 engaging imperforate card portions are insulated from their contacts 30 and accordingly interrupt the electrical circuits in which these pins and contacts are included.

Referring to FIG. 10, the outputs from each group of four adjoining contacts 30 of like significance, as A, A, A, A, FIG. 10, are mixed and the ten outputs from the four-way mixes FWM, omitted for clarity from FIG. 9, for each card pass along lines CS1, to a ten-way mix TWM, one for each of the four programme cards. The outputs from the four ten-way mixes TWM pass along lines CS2 to a five-way mix SWM where they are mixed with pulses PBS from the built-in sub-routine instruction unit and pass along the instruction lines CS3 to an order and address decoding unit OAD, FIG. 1, being shaped by a discharge waveform DW, FIG. 11.

By effecting the mixing in three stages FWM, TWM, SWM as just described the effect of the self-capacity of the selenium mixing diodes SMD, FIG. 10, is reduced, and the thermionic diode THD discharges the self-capacity of the mix at the beginning of each interval of time NT during which an entry can be recorded in or read from a track location.

The counter control circuit, FIG. 12, consists of a switch formed by a flip-flop trigger circuit CCF and the lines MPCL, SRCL, referred to above, are connected respectively, through cathode followers CF, to the anodes A1, A2 thereof. The master reset pulse applied at RPP, at the start of a calculation, triggers anode A1 up and A2 down and the calculation accordingly starts with the first instruction of the main programme. When there is applied to a counter-control gate CCG1 a pulse along order line ESR from unit OAD, representative of order "enter sub-routine," a trigger pulse is applied to the trigger circuit CCF during digit times period DT3 and the anode A2 is triggered up and A1 is triggered down and brings down with it the "enter sub-routine" control on line ESR. At the end of the sub-routine is the order "return to main programme" and a pulse along order line RMP representative thereof is transmitted from unit OAD to be gated by a second counter control gate CCG2 with a pulse applied to the gate during digit time DT6 thereby to again trigger A1 up and A2 down.

FIG. 13 illustrates a circuit by which transfer pulses are produced. The number of transfer pulses required may be included as a programme instruction or by storage in a storage location which can be addressed at appropriate times. For the purpose of description it will be assumed that the numbers are included as programme instructions replacing the SB addresses, FIG. 2. The number is punched in the card, according to the 1, 2, 4, 8 code, together with an instruction (in card positions A to F) requiring a transfer which may be an unconditional transfer, a conditional transfer, or an instruction to "enter sub-routine."

A control waveform on order line UT, CT, or ESR, FIG. 13, when passed from the programme decoding unit is fed to a mix, as indicated in FIG. 13, and via line TOL controls input gates TIG1, TIG2, TIG4, TIG8, TIG10, TIG20, TIG40 and TIG80 to a staticizor comprising bi-stable devices TM1, TM2, TM4, TM8, TM10, TM20, TM40 and TM80. The bi-stable devices shown in FIG. 13 are flip-flop trigger circuits. The arrangement is such that the input gates are connected by lines GL with the grids GR1 of the flip-flops and the grids GR2 of the flip-flops are connected with a line EAL to which is applied gated end-of-arithmetic signals EOA, the gating of which is described below with reference to FIG. 14. The lines K, L, M, V, W, X, Y, Z, FIG. 13, which are up in potential, representing the number of transfer pulses required, raise the potentials of the corresponding inputs GR1 when one of the control waveforms opens the input gates, but as the said bi-stable devices are not sensitive to positive-going potentials they will not be triggered. However, when a "no transfer" control potential from the transfer control circuit TCC, FIGS. 1 and 14, conditions the decoders TD and STD, through gates G4 and G41, FIG. 12, for the main programme and sub-routine counters MPC($10^1$) and SRC($10^1$) the potentials of those input gates TIG1 to TIG80 which are brought down thus triggering the flip-flops connected therewith. The bi-stable devices TM1 to TM80 are, therefore, set-up according to the number in the SB section of the programme card. The gate G4, FIG. 12, closes the gates of the decoder TD when the counter SRC($10^0$), SRC($10^1$) is operative, and gate G41 closes the gates of the decoder STD when the counter MPC($10^0$) and MPC($10^1$) is operative.

The MA1 anodes of the flip-flops each, via cathode followers CF, control one of eight transfer pulses output gates TOG1, TOG2, TOG4, TOG8, TOG10, TOG20, TOG40, TOG80 and during each interval NT groups of discrete pulses are applied to these gates, one pulse to gates TOG1, TOG10, two pulses to gates TOG2, TOG20, four pulses to TOG4, TOG40 and eight pulses to TOG8, TOG80. All of these pulses occur after digit time DT3 of an interval NT so that in any interval NT in which any of the flip-flops TM1 to TM80 are triggered there will pass through the gates TOG1 to TOG80 a number of pulses corresponding to the number of transfer pulses called for by the programme card. The pulses from gates TOG1 to TOG8 pass to a units cathode follower mix UCM and those from gates TOG10 to TOG80 pass to a tens cathode follower mix TCM. The bi-stable devices are reset on completion of the instruction by the above-mentioned gated end-of-arithmetic pulse EOA.

It is to be understood that the input gates TIG1 to TIG80 are included in FIG. 13 only because the bi-stable devices TM1 to TM80 are also used for pulses other than transfer pulses and which have no connection with the present invention, the input gates being opened for pulses other than transfer pulses, as for example, by a potential applied at MOF. When the bi-stable devices are used only for transfer pulses the lines GL may connect grids GR1 directly to the appropriate lines K, L, M, V, W, X, Y, Z, FIG. 13, because the transfer gates G1, G2, G11, G21, only open for transfers.

The transfer control circuit TCC is illustrated in FIG. 14 and consists of a flip-flop trigger circuit TCF the anode NA1 of which is normally down in potential while the anode NA2 is normally up in potential, the circuit being restored to this condition at the end of each instruction by the gated end-of-arithmetic signal being applied to line CZ. When a transfer is instructed, the flip-flop is triggered by the passage of a transfer conditioning pulse TCP, which is a clock pulse, through the appropriate one of four transfer-conditioning pulse gates ZG1, ZG2, ZG3, ZG4, to a cathode follower mix CFM. Gate ZG1 is conditioned to pass a pulse TCP by the order "return to main programme" on line RMP, and by pulses applied thereto during digit time DT6. Gate ZG2 is conditioned to pass a pulse TCP by unconditional transfer control potential UT and pulses applied thereto during digit times DT3, while gate ZG3 is conditioned to pass a pulse TCP by "enter sub-routine" potential on order line ESR and by pulses applied thereto during digit time DT3.

Gate ZG4 is a conditional transfer control gate and is conditioned to pass a pulse TCP by a potential derived from the anode MA1 of a flip-flop CTF, on line CTR, and by a pulse applied thereto during digit time DT20. The anode MA2 of the flip-flop CTF is connected by a line CTN to a gate ZG5 which controls the passage of the end-of-arithmetic signal EOA to the lines CZ and EAL.

The output from a mix ZM is connected to the grid MG2 of flip-flop CTF, to feed thereto either a digit time pulse DT2 or a waveform on line NO, which waveform is indicative of a conditional test result "No," the test being effected by means forming no part of the present invention and accordingly not described herein.

The grid MG1 of the flip-flop CTF is connected to the output of a gate ZG6 which is conditioned by the waveform on the conditional transfer order line CT to pass a trigger pulse to the grid MG2 at digit time DT4. The potential of anode MA1 of flip-flop CTF will normally be up from the beginning of DT5 of one interval NT to the end of digit time DT2 of the next succeeding interval NT, being triggered to that condition by triggering pulses at digit times DT2 and DT4 applied respectively to the grids MG2 and MG1 of the flip-flop.

If the conditional test result in "No" a positive pulse is fed on line NO to mix ZM, at digit time DT19 to trigger the flip-flop CTF so that the potential of anode MA2 rises and that of anode MA1 falls. The gate conditioning potential applied on line CTR to the gate ZG4 falls, and no transfer conditioning pulses TCP can pass through the gates ZG4 and mix CFM to trigger the flip-flop TCF. The rise in potential of anode MA2 is transmitted on line CTN to condition gate ZG5 to allow the gated end-of-arithmetic signal to pass to line CZ, and to line EAL, in digit time DT20, so to reset flip-flop TCF and the bi-stable devices TM1 . . . TM80.

If the conditional test result is "yes" there will be no waveform on line NO at digit time DT19, so that anode MA1 of flip-flop CTF remains up in potential and a transfer conditioning pulse TCP will be fed through gate ZG4 at digit time DT20 to trigger the flip-flop TCF.

During operation of the apparatus according to the invention each activating line from the decoding matrix DM, SDM, for the main programme or the sub-routine instruction as appropriate, energizes, through the appropriate strip 25, one instruction column, consisting of twenty-four data-indicating positions, as indicated in FIG. 9. The outputs from uninterrupted pairs of contacts, namely pins 20 and contacts 30, are taken via instruction lines CS3, FIG. 1 to the programme decoding unit OAD, FIG. 1, where they are decoded and raise the potential of the appropriate order line, for example add, subtract, enter sub-routine, unconditional transfer of control, return to main programme, and the two address potentials SA, SB are also raised, as appropriate, to cause reading from or entry to the drum D.

At the end of an instruction time during which an instruction is completed the instruction counter, FIGS. 1, 6 and 7, is triggered by an end-of-arithmetic signal EOA and switches the control to the next instruction of the programme. Normally the control is switched through the instructions of the main programme one at a time in sequential order in a sequence of instruction times.

When it is required to jump a number of instructions as a result of the signalling of an unconditional or a conditional transfer order, or of an order "enter sub-routine," the appropriate number is punched in the SB positions of the programme card, FIG. 2, and via the appropriate strip 25, conditions the appropriate gates TIG1 to TIG80, FIG. 13, so that the required number of transfer pulses are applied to lines TP1, TP2 for addition into the appropriate one of the activating counters. For example, if during the reading of instruction 2 of the main programme this instruction contains an order which may produce a transfer, and the number 37 is read from the SB positions of the first main programme card, the gates TIG10, TIG20, TIG1, TIG2, and TIG4 will be conditioned and via gates TOG10, TOG20, TOG1, TOG2 and TOG4 will permit three transfer pulses to pass via line TP2 to instruction counter MPG($10^1$) and seven transfer pulses to pass via line TP1 to counter MPC($10^0$) so bringing the counter to state 39. At the end of the instruction time the end-of-arithmetic signal EOA triggers the counter so that in the next succeeding instruction time there is immediate access to the instruction 40 which will be read from the first main programme card in unit MPU. While the addition is being effected the programme decoding unit OAD is suppressed by closing gates at any convenient position in the control path from the counter to the unit OAD and in the construction herein described the suppression is effected by closing of the gates of the decoders TD and STD by the drop in potential of line NTC, FIGS. 1 and 14, which will occur at this time due to the transfer pulse control TCC receiving a pulse from the "order" section of decoding unit OAD.

Should it be required to transfer control back by a number of instructions the appropriate activating counter is counted past its maximum (that is back to zero) and up to the instruction next required for reading. For example if following reading of instruction 97 it is required next to read instruction 92 there must be included in the SB positions for the transfer of instruction 98 the number 113 (119—8). On reading of the number 113 the activating counter will count up to 119 and then from 0 to 91 and the end-of-arithmetic signal EOA brings it to 92.

The effecting of a transfer or "jump" is always as just described, but when the order is for an unconditional transfer, the transfer or "jump" is completed by the steps just described.

When the order is for a conditional transfer of control, in either the main programme instruction unit or the sub-routine instruction unit, the conditional test referred to above is effected in one interval NT which immediately precedes the interval NT in which a transfer or "jump" may be effected, so that the instruction time is two intervals NT.

If the result of the conditional test is "yes" then it is necessary to fulfill three conditions namely:

(1) to suppress the gated end-of-arithmetic signal EOA at the end of said one interval NT;

(2) to condition gate ZG4 to permit the passage of a transfer conditioning pulse TCP therethrough at digit time DT20 in said one interval thereby to trigger flip-flop TCF and so permit the transfer or "jump" to occur in the interval NT next succeeding said one interval NT; and (3) to allow the gated end-of-arithmetic signal to reset flip-flop TCF and bistable devices TM1 . . . TM80 at the end of said succeeding interval NT. These three conditions are fulfilled in the following manner, namely:

(1) The passage of the end-of-arithmetic signal EOA through gate ZG3 at digit time DT20 is controlled by the potential of line CTN which is connected to the anode MA2 of flip-flop CTF. This flip-flop is triggered by a gated digit time pulse DT4 applied to the grid MG1 from gate ZG6 so that anode MA2 is then down in potential until a triggering pulse is applied to the grid MG2 from the mix ZM. Since the result of the conditional test is "yes," no waveform will be fed on the line NO to mix ZM at digit time DT19, and the anode MA2 will remain down in potential until the digit time pulse DT2 is fed to the mix ZM in the next succeeding interval NT. The potential of line CTN is therefore down at digit time DT20 in the said one interval NT and the end-of-arithmetic signal cannot pass on to the lines CZ and EAL.

(2) At the time when the anode MA2 of flip-flop CTF is down in potential, the anode MA1 is up in potential and the gate ZG4 is conditioned by the potential fed thereto on the line CTR. Therefore at the end of the said one interval NT, during digit time DT20, a transfer conditioning pulse TCP will pass through the gate to trigger the flip-flop TCF.

(3) At the end of the said one interval NT the flip-flop TCF will have been triggered by a pulse from the mix CFM so that anode NA1 will be up in potential and anode NA2 will be down; that is line NTC, FIGS. 1 and 14, will be down in potential, and the tens decoder TD or STD will no longer be conditioned and the decoder OAD will be rendered ineffective. The potential of the order line CT will therefore fall, and in the said succeeding interval NT the gate ZG6 will be closed. The potential of anode MA2 of flip-flop CTF, FIG. 14, will therefore remain up after being triggered to that condition by digit time DT2 in the said succeeding interval, the gate ZG5 is conditioned by a potential on line CTN and the end-of-arithmetic signal is fed to the line CZ and EAL at the end of that interval NT, to reset the flip-flop TCF and the bi-stable devices TM1 . . . TM80.

If the result of the conditional test is "No," it is then necessary to fulfil two conditions, namely:

(1) to condition gate ZG5 to pass an end-of-arithmetic signal EOA at the end of the said one interval NT, and (2) to suppress gate ZG4 at the end of said one interval NT so that a transfer conditioning pulse TCP cannot pass therethrough to trigger flip-flop TCF.

These two conditions are fulfilled in the following manner:

(1) During the said one interval NT, gate ZG6 is conditioned by a waveform on line CT to pass digit time pulse DT4 to the grid MG1 of flip-flop CTF. The potential of anode MA1 is triggered up thereby, so that ZG4 is conditioned by a potential on line CTR, and the potential on line CTN is down. Since the result of the conditional test is "No," a waveform at digit time DT19 in the said one interval NT will be fed to mix ZM on line NO, and will trigger flip-flop CTF so that anode MA2 and line CTN are up in potential, while anode MA1 and line CTR are down in potential. The gate ZG5 is thus conditioned to pass an end-of-arithmetic signal at the end of said one interval NT, so that the appropriate activating counter is triggered to activate the activating line next succeeding the line which activated the instruction which signalled the conditional test.

(2) At the end of digit time DT19 in said one interval NT the potential on line CTN will fall as described above. The gate ZG4 will not therefore be conditioned to pass a transfer conditioning pulse TCP during digit time DT20 in said one interval NT, and the transfer control flip-flop TCF will not be triggered.

To transfer control from the main programme unit MPU to the sub-routine instruction unit SRU, to FIG. 1, an instruction "enter sub-routine" is included in a main programme card and on reading of this instruction an order pulse on order line ESR, FIGS. 1 and 12, causes the anode A1, FIG. 14, to be triggered down and A2 to be triggered up so that line MPCL is down in potential and all gates to and from the counter MPC(10⁰), MPC(10¹) are closed while line SRCL is up in potential, and the gates to and from counter SRC(10⁰), SRC(10¹) are opened. Accordingly the succeeding instructions are passed from unit SRU to decoding unit OAD, but an indication must be given as to which sub-routine instruction is to be first carried out. This is done by including in the SB positions of the "enter sub-routine" instruction a number, as just described above, to trigger the counter SRC from zero to the required instruction.

When control is transferred from the main programme instruction unit MPU to the sub-routine instruction unit SRU, the main programme counter is not reset, so that when control is transferred back to the main programme unit by the "return to main programme" order on line RMP, the next end-of-arithmetic signal will trigger the main programme counter, and the programme will proceed by instructing the machine to effect the instruction next succeeding the one which ordered the transfer of control to the sub-routine instruction unit.

The instruction "return to main programme" causes a potential to be fed from the decoding unit OAD, FIG. 1, to lines RMP, FIGS. 12 and 14. The flip-flop CCF is triggered so that anode A1 and line MPCL are up in potential, and anode A2 and line SRCL are down in potential.

All gates to and from the main programme counter are then open, and all these to and from the sub-routine counter closed, and the operation of the machine is controlled by the main programme instruction unit.

I claim:

1. In an electrical programme controlled computing machine, programme apparatus comprising a group of instruction lines selectively energisable to indicate coded instructions, a plurality of normally inactive activating lines one for each instruction of a programme, a plurality of groups of electrical switches one group for each activating line, each group being connected between the activating line appropriate thereto and the instruction lines and being presettable to select a number of instruction lines for energisation, a serial counter operable normally to energise the activating lines sequentially in a sequence of equal instruction times, an instruction decoder connected to the instruction lines, control means for said serial counter connected to each denomination of the counter and to a selected number of said instruction lines, and a transfer of control order line connecting the counter control means to the instruction decoder, whereby when said order line is energised the pattern of energisation of said selected instruction lines determines a transfer number to be transmitted to said counter and said control means is operable to producing corresponding transfer pulses for addition into the denominations of said counter in parallel, so that before the end of the instruction time in which a transfer order is signalled on said order line, the counter is advanced to a count other than the next in sequence to transfer control to an instruction other than the next in sequence.

2. In an electrical programme controlled computing machine, programme apparatus comprising a group of instruction lines selectively energisable to indicate coded instructions, a plurality of normally inactive activating lines one for each instruction of a programme, a plurality of groups of electrical switches one group for each activating line, each group being connected between the activating line appropriate thereto and the instruction lines and being presettable to select a number of instruction lines for energisation, a serial counter and counter decoder having a number of stable states at least equal to the maximum number of activating lines and normally operable by the application to the counter of end-of-arithmetic signals to energise the activating lines sequentially in a regular sequence of equal instruction lines, an instruction decoding matrix connected to the instruction lines, control means for said serial counter connected to each denomination of the counter and to a selected number of said instruction lines, and a transfer of control order line connecting the counter control means to said decoding matrix, said control means including transfer pulse producing means operable when said transfer of control order line is energised to produce transfer pulses, corresponding to a transfer number indicated by a pattern of energisation of selected instruction lines, for addition into the denominations of said counter in parallel, so that before the end of the instruction time in which a transfer order is signalled on said order line the counter is advanced to a count which is one less than that required to energise an activating line out of sequence by a given number so that control is transferred to the desired out-of-sequence activating line on the application to the counter of the next end-of-arithmetic signal, and transfer control means connected to the counter decoders to suppress the activating lines during the application of transfer pulses in parallel to the denominations of the counter during said instruction time in which the transfer order is signalled.

3. Apparatus according to claim 2, wherein the transfer pulse producing means comprises transfer pulse gates to which discrete pulses are applicable at predetermined intervals during an instruction time, parallel output lines connecting the transfer pulse gates to the counter, and a bi-stable device connected to each transfer pulse gate to control the passage of said discrete pulses therethrough, each said bi-stable device being arranged for triggering to the gate opening condition thereof by a pulse applied thereto under control of an energised one of said selected instruction lines.

4. Apparatus according to claim 3, including an input gate for each bi-stable device to control triggering thereof to the condition in which it conditions its transfer pulse gate to pass said discrete pulses, each said input gate being arranged for conditioning by an activated order line to permit the passage therethrough of potential applied to an energised one of said selected instruction lines.

5. Apparatus according to claim 4, wherein the transfer control means comprises transfer gates connected to said serial counter, a transfer-controlling flip-flop trigger circuit the anodes of which are connected respectively by a transfer pulse line to said transfer gates and by a no-transfer line to said counter decoder, said trigger circuit being arranged to be triggered to cause the no-transfer line to be up in potential by gated end-of-arithmetic signals, and to be triggered to cause the transfer pulse line to be up in potential by transfer-conditioning pulses applicable thereto from a cathode-follower mix connected with a plurality of transfer-conditioning pulse gates adapted to pass transfer-conditioning pulses under control of active order lines and pulses applicable thereto at predetermined intervals.

6. Apparatus according to claim 2, wherein the transfer control means comprises transfer gates connected to said serial counter, a transfer-controlling flip-flop trigger circuit the anodes of which are connected respectively by a transfer pulse line to said transfer gates and by a no-transfer line to said counter decoder, said trigger circuit being arranged to be triggered to cause the no-transfer line to be up in potential by gated end-of-arithmetic signals, and to be triggered to cause the transfer pulse line to be up in potential by transfer-conditioning pulses applicable thereto from a cathode follower mix connected with a plurality of transfer-conditioning pulse gates adapted to pass transfer-conditioning pulses under control of active order lines and pulses applicable thereto at predetermined intervals.

7. In an electrical programme controlled computing machine, programme apparatus comprising a main programme unit including a group of main programme instruction lines selectively energisable to indicate coded instructions, a plurality of normally inactive main programme activating lines one for each instruction of a main programme, a plurality of groups of electrical switches one group for each main programme activating line, each group being connected between the main programme activating line appropriate thereto and the main programme instruction lines and being presettable to select a number of main programme instruction lines for energisation, and a main programme serial counter operable normally to energise the main programme activating lines sequentially in a sequence of equal instruction times, a sub-routine unit including a group of sub-routine instruction lines selectively energised to indicate coded instructions, a plurality of normally inactive sub-routine activating lines one for each instruction of a sub-routine, a plurality of groups of electrical switches one group for each sub-routine activating line, each group being connected between the sub-routine activating line appropriate thereto and the sub-routine instruction lines and being presettable to select a number of sub-routine instruction lines for energisation, and a sub-routine serial counter operable normally to energise the sub-routine activating lines sequentially in a sequence of equal instruction times, an instruction decoder connected to the main programme and sub-routine instruction lines, a transfer of control order line connected to an output of the instruction decoder, counter control means connected to said order line and to a selected number of said instruction lines which indicate, when said order line is energised, a transfer number to be transmitted to said counter, and a counter selecting switch connecting said control means to each denomination of said main programme and sub-routine counters and operable to determine which of said serial counters is to be subject to control, said control means being operable to produce transfer pulses corresponding to said transfer number for addition into the denominations of one of said counters in parallel, so that before the end of the instruction time in which a transfer order is signalled on said order line, the selected counter is advanced to a count other than the next in sequence to transfer control to an instruction other than the next in sequence.

8. Apparatus according to claim 7, wherein the main programme electrical switches and the sub-routine electrical switches are respectively arranged to be presettable at least in part by interchangeable main programme cards and sub-routine cards insertable between the contacts of the switches to select a number of instruction lines for energisation.

9. Apparatus according to claim 8, wherein the counter selecting switch comprises a flip-flop trigger unit the anodes of which are connected respectively to the main programme counter and to the sub-routine counter, and gates connected to the respective grids of the flip-flop unit to control triggering thereof when a predetermined order line connected thereto is up in potential and a flip-flop triggering signal is applied thereto.

10. Apparatus according to claim 7, wherein the main programme counter and the sub-routine counter each comprises a binary-coded counter and a counter decoder and are respectively operable normally to energise sequentially the main programme activating lines and the sub-routine activating lines, each binary-coded counter having a number of stable states at least equal to the maximum number of activating lines connected to the counter decoder therefor and being operable by the application thereto of end-of-arithmetic signals to energise the activating lines as appropriate, the counter control means is connected to each denomination to each of the counters and to a selected number of said instruction lines, and a transfer of control order line connects the counter control means to said decoding matrix, said control means including transfer pulse producing means operable when said transfer of control order line is energised to produce transfer pulses corresponding to a transfer number, indicated by a pattern of energisation of selected instruction lines, for addition into the denominations of a selected one of said counters in parallel whereby the selected counter is advanced to a count which is one less than that required to energise an activating line out of sequence by a given number so that control is transferred to the desired out-of-sequence activating line on the application to the selected counter of the next end-of-arithmetic signal, and transfer control means connected to the counter decoders to suppress the activating lines during the application of transfer pulses in parallel to the denominations of the selected counter during said instruction time in which the transfer order is signalled.

11. Apparatus according to claim 10, wherein the transfer control means comprises transfer gates connected to said main programme and sub-routine counters, a transfer controlling flip-flop trigger circuit the anodes of which are connected respectively by a transfer pulse line to said transfer gate and by a no-transfer line to said counter decoders, said trigger circuit being arranged to be triggered to cause the no-transfer line to be up in potential by gated end-of-arithmetic signals and to be triggered to cause the transfer pulse line to be up in potential by transfer-conditioning pulses applicable thereto from a cathode follower mix connected with a plurality of transfer-conditioning pulse gates adapted to pass transfer-conditioning pulses under control of active order lines and pulses applicable thereto at predetermined intervals.

12. Apparatus according to claim 10, wherein the transfer pulse producing means comprises transfer pulse gates to which discrete pulses are applicable at predetermined intervals during an instruction time, parallel, output lines connecting the transfer pulse gates to the transfer gates, and a bi-stable device connected to each transfer pulse gate to control the passage of said discrete pulses therethrough, each said bi-stable device being arranged for triggering to the gate opening condition thereof by a pulse applied thereto under control of an energised one of said selected instruction lines.

13. Apparatus according to claim 12, wherein each counter comprises a units denomination and a tens denomination and the transfer gates are connected to a units transfer pulse mix and a tens transfer pulse mix by which units and tens transfer pulses are respectively applied directly to the units and tens denominations of the counter.

14. Apparatus according to claim 13, including an input gate for each said bi-stable device to control triggering thereof to the condition in which it conditions its transfer pulse gate to pass said discrete pulses, each said input gate being arranged for conditioning by an activated order line to permit the passage therethrough of potential applied to an energised one of said selected instruction lines.

15. Apparatus according to claim 14, wherein the transfer control means comprises transfer gates connected to said main programme and sub-routine counters a transfer-controlling flip-flop trigger circuit the anodes of which are connected respectively by a transfer pulse line to said transfer gates and by a no-transfer line to said counter decoders, said trigger circuit being arranged to be triggered to cause the no-transfer line to be up in potential by gated end-of-arithmetic signals, and to be triggered to cause the transfer pulse line to be up in potential by transfer-conditioning pulses applicable thereto from a cathode follower mix connected with a plurality of transfer-conditioning pulse gates adapted to pass to transfer-conditioning pulses under control of active order lines and pulses applicable thereto at predetermined intervals.

References Cited in the file of this patent

UNITED STATES PATENTS

| | | |
|---|---|---|
| 2,636,672 | Hamilton | Apr. 28, 1953 |
| 2,658,681 | Palmer | Nov. 10, 1953 |
| 2,697,549 | Hobbs | Dec. 21, 1954 |
| 2,792,991 | Di Cambio | May 21, 1957 |

OTHER REFERENCES

Burks: Electronic Computing Circuits of the Eniac, Proceedings of I.R.E., vol. 35, No. 8, August 1947, pages 764–765.

Goldstine et al.: The Electronic Numerical Integrator and Computer (ENIAC), Mathematical Tables, April 1946, pages 107–110.

Jacobs: "Design Features of the Jaincomp-C and Jaincomp D Electronic Digital Computers," IRE Convention Record, part IV, 1954, pages 98 to 101, and 104.

"24-Digit Parallel Computer With Magnetic Drum Memory," Engineering Research Associates, 1949, pages 35 to 44.

Greenwald et al.: "SEAC," IRE Proceedings, October 1953, pages 1300–1303.